Dec. 20, 1932.                J. A. E. DUPUIS                1,891,526
                                  HARVESTER
                              Filed Dec. 4, 1930
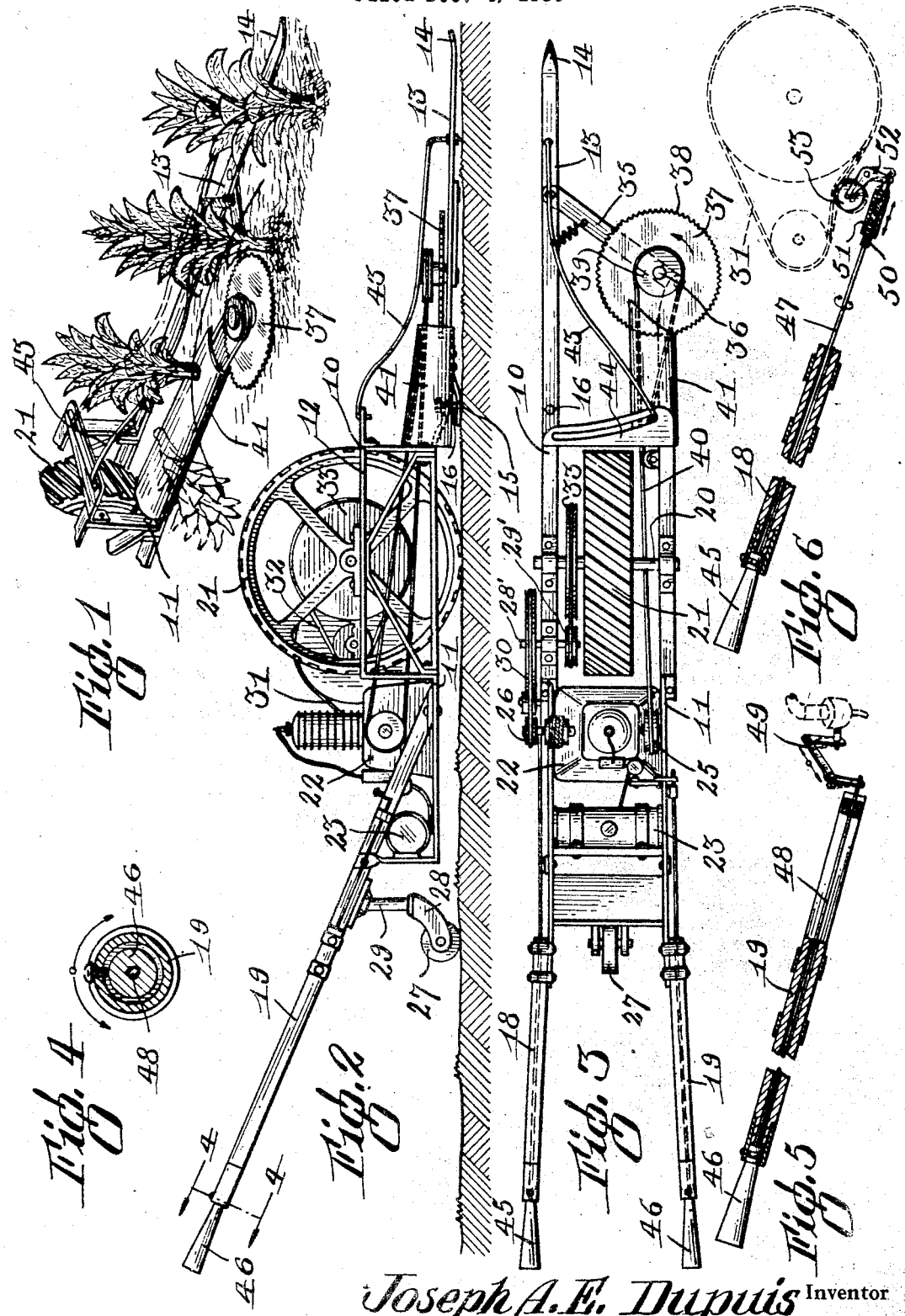
Joseph A. E. Dupuis Inventor
By Marion F Marion
Attorneys Patented Dec. 20, 1932

1,891,526

UNITED STATES PATENT OFFICE

JOSEPH A. E. DUPUIS, OF ST. JACQUES, QUEBEC, CANADA, ASSIGNOR OF ONE-HALF TO DAVID DUPUIS, OF ST. JACQUES, QUEBEC, CANADA

HARVESTER

Application filed December 4, 1930. Serial No. 500,043.

The present invention relates to harvesting machines and has particular reference to a machine for cutting tobacco plants and the like.

An important object of the invention is the provision of a tobacco plant cutting machine of the rotating cutting disc type adapted to cut the stems horizontally adjacent the ground.

A further object of the invention is the provision of a machine of the above character having a cutting disc disposed forwardly of the carrier wheel and motor driven.

Another object of the invention is the provision of a cutting machine of the above type wherein a unitary motor is employed to drive the machine as well as the cutting element.

Still another object of the invention is the provision of a cutting machine of the above character having means for readily adjusting the position of the cutting element with respect to the ground.

A still further object of the invention is the provision of a cutting machine of the above character designed to enable convenient manipulation and effective cutting of tobacco and like plants.

A further object of the invention is the provision of a machine of the above type embodying a resilient clearer adapted to eject the cut plants during the progress of the machine.

Other objects and advantages of the invention will become apparent as the description progresses.

In the accompanying drawing forming a part of this specification and in which like reference characters are employed to designate corresponding parts throughout the same:

Figure 1 is a fragmentary perspective view illustrating the operation of the machine.

Figure 2 is a side elevational view of the assembled machine,

Figure 3 is a top plan view of the same,

Figure 4 is an enlarged transverse section taken on the line 4—4 of Figure 2,

Figure 5 is a longitudinal section through one of the handle bars illustrating the motor control mechanism, and Figure 6 is a similar view through a complementary handle bar showing the belt drive tightening control mechanism.

Referring to the drawing, wherein for the purpose of illustration is shown a preferred embodiment of the invention, the numeral 10 generally designates the machine frame which is composed of metallic bars embodying a relatively narrow rectangular shaped body 11 disposed centrally and provided with raised side sections 12. Projecting forwardly from one side of the frame body 11 is a relatively narrow skid bar 13 having its forward extremity tapered and upturned, as indicated at 14, for unobstructive movement over the ground.

Adjacent its rear end, the skid bar 13 carries a parallel depending slide tongue 15 resiliently connected with the skid bar and vertically adjusted through the instrumentality of a threaded bolt 16, whereby the forward portion of the machine may be vertically adjusted with respect to the ground over which the machine is travelling.

To the rear portion of the main frame 11 are connected a pair of handle bars 18 and 19 projecting rearwardly at an upwardly inclined angle.

On the elevated portion 12 of the frame is journaled a transversely extending shaft 20 on the intermediate portion of which is fixed a relatively large drive and carrier wheel 21. Thus, the wheel 21 is disposed in a substantially central position in the frame and is provided with a relatively wide tread to effectively balance the machine.

In the rear of the wheel 12, the frame carries a drive motor 22, preferably a motor of the internal combustion type, to which fuel is supplied from a fuel tank 23. The motor drive shaft is mounted so as to project from both sides of the motor and carries drive pulleys 25 and 26 upon opposed extremities thereof.

The rear end of the machine frame is supported upon a roller 27 rotatably supported in the lower end of a pivot bracket 28. The upper end of the pivot bracket is pivotally associated with a standard 29 depending from the rear portion of the frame.

Mounted transversely on one side of the frame body 11 and journaled thereon is an auxiliary shaft 28' having fixed on its inner end a small drive pulley 29' and upon its outer end a relatively large pulley 30. A drive belt 31 is trained over the drive pulley 26 and the pulley 30. A second drive belt 32 is trained over the pulley 29' and over a relatively large pulley 33 fixed on the shaft 20 at one side of the carrier wheel 21. This mechanism produces a reduction drive gear between the motor and the drive or carrier wheel 21.

At the front of the frame is formed an angular support embodying a horizontal angularly extending front bar 35 and a bar projecting from one side of the frame body. At the juncture of these elements is positioned an upstanding bearing pivot 36 about which is rotatably positioned a rotatable cutting disc 37. The disc 37 is provided with a serrated peripheral edge 38 providing a rotatable cutting saw. Attached to the hub of the disc and arranged thereabove is a pulley 39 having trained thereover a drive belt 40 which is also trained over the drive pulley 25. The forwardly projecting portion of the belt 40 is protected by a guard sleeve 41.

Adjacent the disc is provided a clearer member 43 in the form of an arcuately bent rod having its forward end pivotally connected with the forward portion of the skid bar 13 and its rear end slidably associated with a grooved plate 44 attached to the frame body. The clearer rod 43 is mounted so as to intercept and laterally discharge the cut plants during the operative progress of the machine.

In the rear extremity of the handle bars 18 and 19 are rotatably connected tapered handle members 45 and 46 having connection with operating rods 47 and 48 extending rotatably through the bars.

The rod 47 is attached, at its lower end, with an exteriorly threaded shank 50 threadedly engaging an interiorly threaded sleeve 51. The sleeve 51 is pivotally connected with one arm of a bell crank lever 52 while, upon the extremity of the opposed arm is rotatably mounted a pulley 53. The pulley 53 is disposed to engage the drive belt 31 so that upon proper rotation of the handle 45 the belt may be tightened or permitted to assume a relatively loose engagement with the pulleys 26 and 30.

The rod 48 connects with a link mechanism 49 which is also attached to the carburetter throttle valve stem whereby the operation of the motor may be readily controlled.

The machine operates as follows: The tightening roller 53 is adjusted to a retracted arrangement so that the belt 31 is mounted loosely on the pulleys 26 and 30. The motor is then started, immediately causing rotation of the cutting disc 37 at a high rate of speed so as to cleanly sever the stems of the tobacco plants. The roller 53 is then adjusted to a belt tightening arrangement to cause movement of the machine.

During its operation, the machine is driven along the rows of tobacco plants so that the rotary cutter disc will successively engage and cut the same. As the plant is severed it comes into contact with the clearer rod 43 which, by its resilient structure will automatically throw the same to one side out of the path of the carrier wheel.

It is to be understood that the form of my invention herein shown and described is to be taken as a preferred example of the same, and that various changes as to the shape, size, and arrangement of parts may be resorted to without departing from the spirit of the invention or the scope of the subjoined claims.

Having thus described my invention, I claim:

1. In a machine of the character described, a frame, a drive and carrier wheel rotatably associated with the frame in a substantially central position, a rotatable saw mounted horizontally on the forward portion of the frame, a motor mounted on the frame, mechanism associated with the motor and the drive wheel for driving the latter, an operating connection between the motor and the rotary saw for actuating the latter, a steering roller connected with the rear portion of the frame and an adjustable shoe on the frame, adjacent the saw, to support the front of the machine and regulate the height of the saw above the ground.

2. In a machine for cutting plant stalks, a frame, a main carrier and drive wheel mounted centrally of the frame, a rotary cutting element mounted horizontally on the forward extension of the frame, a motor mounted on the frame, drive means connecting the motor and the drive wheel, drive means connecting the motor with the rotatable cutting element for rotatably actuating the latter a guard over the cutting element drive means, and a resilient clearer member adapted to urge severed stalks against and over the guard.

3. In a machine for cutting tobacco plant, a wheeled frame, a rotary saw mounted horizontally on the forward extension of the frame, motor means for rotatably actuating the said saw, a resilient clearer member adapted to laterally discard the tobacco plant cut by the saw, a skid bar secured to the forward end of the frame to extend under the tobacco leaves, and a ground shoe adapted to regulate the minimum height of the saw above the ground.

In witness whereof I have hereunto set my hand.

JOSEPH A. E. DUPUIS.